(12) United States Patent
Tousi et al.

(10) Patent No.: US 6,820,908 B1
(45) Date of Patent: Nov. 23, 2004

(54) ISOLATION MOUNT

(75) Inventors: Shahram Tousi, Canton, MI (US); Ulrich Bressler, Manchester, NH (US); Casimir R. Kiczek, Ann Arbor, MI (US)

(73) Assignee: Freundenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 09/560,341

(22) Filed: Apr. 28, 2000

(51) Int. Cl.$^7$ .............................................. B62D 24/04
(52) U.S. Cl. .................... 296/35.1; 267/141.7; 248/609
(58) Field of Search ........................ 296/35.1; 267/141, 267/141.6, 141.7, 153; 248/609

(56) References Cited

U.S. PATENT DOCUMENTS

| | | | |
|---|---|---|---|
| 3,245,646 A | * | 4/1966 | Baratoff |
| 3,250,565 A | * | 5/1966 | Jaskowiak |
| 3,266,139 A | * | 8/1966 | Adams |
| 3,809,427 A | | 5/1974 | Bennett |
| 3,927,730 A | | 12/1975 | Winslow |
| 4,286,777 A | | 9/1981 | Brown |
| 5,110,081 A | | 5/1992 | Lang, Jr. |
| 5,152,510 A | * | 10/1992 | Komabashiri |
| 5,170,985 A | | 12/1992 | Killworth et al. |
| 5,219,439 A | * | 6/1993 | Moore et al. |
| 5,295,671 A | * | 3/1994 | Nakagaki et al. |
| 5,299,788 A | * | 4/1994 | Kanda |
| 5,405,118 A | | 4/1995 | Dietz et al. |
| 5,409,283 A | | 4/1995 | Ban |
| 5,551,661 A | | 9/1996 | Bunker |
| 5,580,028 A | | 12/1996 | Tomczak et al. |
| 5,597,173 A | * | 1/1997 | Schindler et al. |
| 5,636,857 A | * | 6/1997 | Tandy, Jr. et al. |
| 5,704,598 A | * | 1/1998 | Kojima |
| 5,718,407 A | * | 2/1998 | Lee |
| 5,746,411 A | | 5/1998 | Bruas et al. |
| 5,799,930 A | | 9/1998 | Willett |
| 5,813,665 A | * | 9/1998 | Kanda |
| 5,842,677 A | | 12/1998 | Sweeney et al. |
| 5,865,429 A | * | 2/1999 | Gautheron |
| 5,957,427 A | | 9/1999 | Hanson |
| 6,189,874 B1 | * | 2/2001 | Carlson |
| 6,419,215 B1 | * | 7/2002 | Johnson et al. |

* cited by examiner

*Primary Examiner*—Jason Morrow
(74) *Attorney, Agent, or Firm*—Ronald W. Wangerow; A. Michael Tucker; Casimir R. Kiczek

(57) ABSTRACT

An isolation mount for use in motor vehicles in which the mount is sandwiched between the subframe and body. The mount includes an elastomeric upper mount and lower mount and a threaded fastener drawing the two elastomeric mounts together. The upper mount has an insert member with an oblong shape in the lateral displacement direction of the vehicle. The oblong shape increases the volume of elastomer that can be used to respond to lateral forces and reduces the stresses developed on the elastomer. The lateral response rate is stiffer than the fore and aft response rate and both are stiffer than the vertical response rate.

4 Claims, 3 Drawing Sheets

ISOLATION MOUNT

BACKGROUND OF THE INVENTION

The present invention relates to an isolation mount used in securing a vehicle body to a support structure, such as a vehicle cradle mount or subframe, and for absorbing vibrations and movements between the two structures.

Subframe mounts are used extensively in unibody vehicles to isolate the vibration which is transmitted from the engine to the subframe and the body. The subframe mount also improves vehicle dynamics by providing vertical stiffness, lateral stiffness and fore and aft stiffness and their respective stiffness rates. The operator of the vehicle perceives that vibration isolation relates to ride quality and that improved vehicle dynamics translates into improved handling performance.

Typically, there are as many as four locations on the subframe where an isolation mount is utilized. The subframe is sandwiched between the upper portion and the lower portion of the vibration mount and the vehicle body rests on top of the upper mount. A bolt extends through an aperture in the frame and the isolation mount. The lower mount and then the upper mount are connected by a cage nut on the body to complete the attachment, of the body to the subframe. The mount isolates engine or transmission induced vibration that is transmitted along the subframe to the body. The mount also improves vehicle dynamics by controlling or attenuating relative movement between the vehicle body and subframe in the vertical mode or plane, that is up and down, relative movement, and also to control lateral mode or plane, that is side to side movement, and fore and aft mode or plane, that is front to back relative movement., A typical design of a subframe isolation mount employs a relatively hard or high durometer rubber (typically 40 to 80 Shore A) as an isolating material. High durometer rubber for cradle or subframe mounts is an excellent material for improved handling in the lateral plane, especially when it is combined with rate plates to stiffen the response in the lateral plane and to a limited degree the fore and aft plane. However, since the solid elastomeric material is generally very stiff, it does not control or attenuate vertical forces from the subframe to the body very effectively. As a result, the isolation mount has a high lateral stiffness rate response which is desirable but it has a fore and aft stiffness rate response which is marginally acceptable and a vertical stiffness rate response which is low. Therefore, good ride and handling of a vehicle are compromised because of the stiffness properties of the solid elastomeric material.

Thus, there is a need for a vibration isolation mount that provides for ride quality that is satisfactory to the operator without sacrificing the handling characteristics of the vehicle in the lateral plane, fore and aft plane and vertical plane. Additionally, there is a need for a mount that is lighter in weight, improves durability and reduces both initial and high mileage noise, vibration, and harshness between a subframe and a body.

SUMMARY OF THE INVENTION

The present invention discloses an isolation mount for motor vehicles having a subframe or cradle and a body. The body has an aperture and the subframe has a through hole. The isolation mount includes a foamed elastomeric annular upper isolation member between the body and the subframe. The foamed elastomeric insert member is disposed in the annular upper member and extends therefrom. The insert member has an elliptical inner axial passageway. An elliptical isolation member extends from the upper isolation member and is contiguous to the elliptical inner axial passageway of the insert member. The elliptical isolation member has a cross sectional area and a passageway. The cross sectional area has a major axis and a minor axis. The major axis provides control or attenuation for lateral vibration and the minor axis provides control or attenuation for fore and aft vibration. An elliptical retainer member is disposed in the passageway. The retainer has a bore. The annular lower isolation member is mounted to the opposite subframe opposite the annular upper isolation member. The annular lower isolation member and the annular upper isolation member provide control or attenuation for vertical vibration. Thus, a simpler, more cost effective isolation mount is provided which improves vehicle dynamics between the body and the subframe in the vertical direction, lateral direction and fore and aft directions.

It is an object of the present invention to provide a foamed elastomeric isolation mount with an elliptical insert which attenuates the vibration transmitted from the subframe to the body as well as providing improved vertical mode, lateral mode, and fore and aft mode stiffness for improved vehicle dynamics.

It is another object of the present invention to provide an isolation mount with an elliptical insert which utilizes foamed elastomeric upper and lower mounts which isolate vibration transmitted from the subframe to the body, as well as providing low vertical stiffness, high lateral stiffness and moderate fore and aft stiffness to improve handling performance of the vehicle.

These and other features of the present invention will become apparent from the subsequent descriptions and drawings.

BRIEF DESCRIPTION OF THE DRAWINGS

The various advantages of the present invention will become apparent to one skilled in the art upon reading the following specification and by reference to the drawings which include.

DETAILED DESCRIPTION OF THE PREFERRED EMBODIMENT

Figure 1:
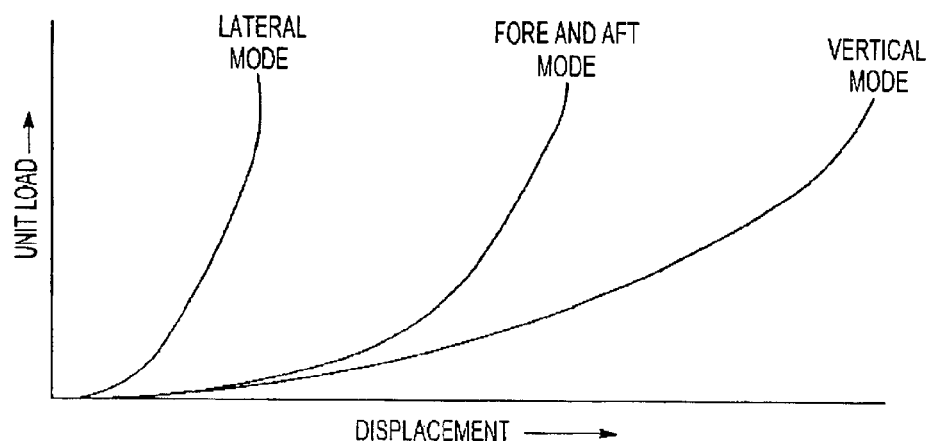
FIG. 1 is the desired relationship of vehicle load and displacement on the isolation mount in the lateral mode, fore and aft mode and vertical mode.
Figure 2:
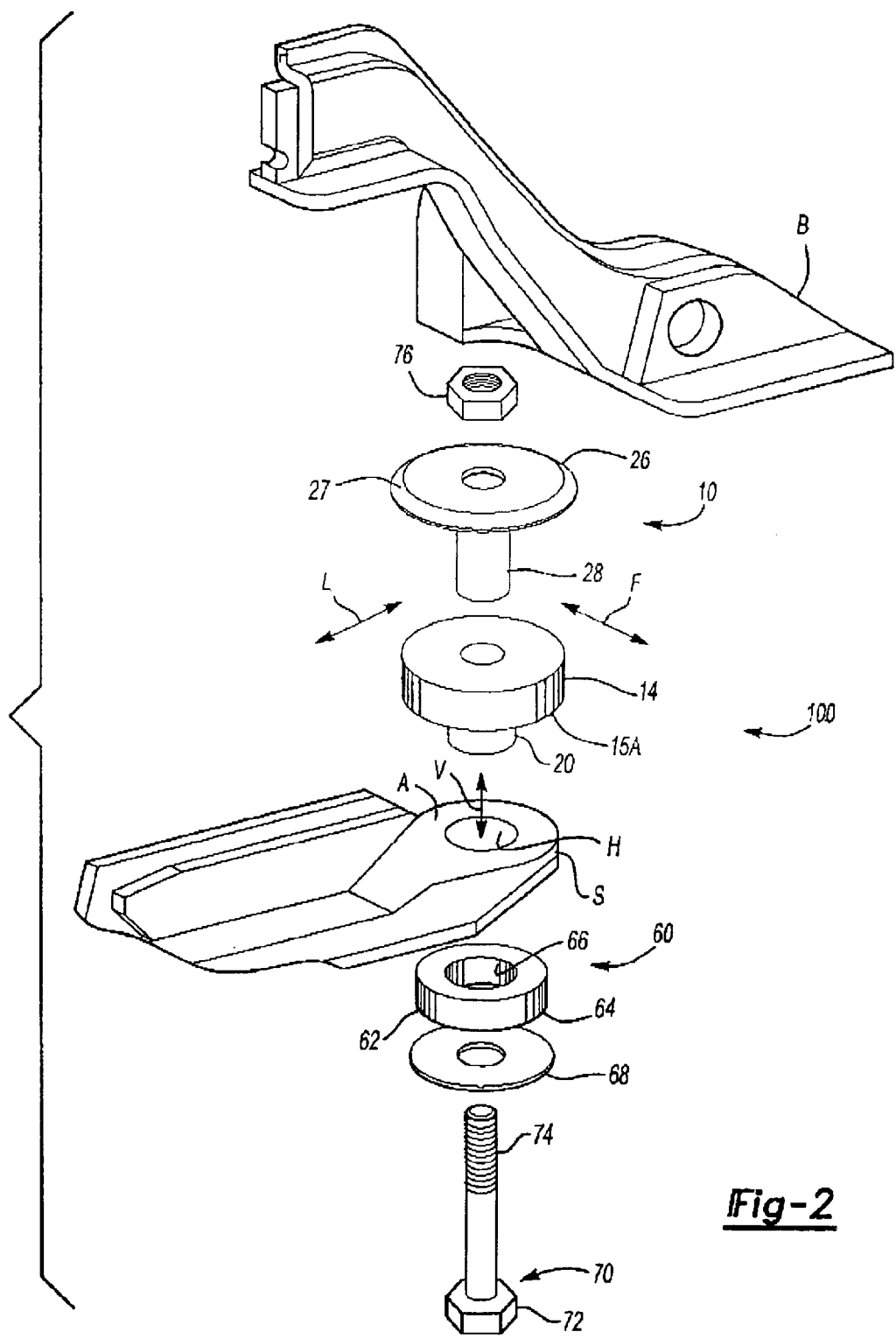
FIG. 2 is an exploded view of the isolation mount oriented for assembly to a vehicle according to the invention.

As used herein, fore and aft mode shake means front to back movement or displacement which is along the longitudinal axis of the vehicle and transverse of the axis of a mount and is identified by the letter F in FIG. 2. Vertical mode shake means up and down movement or displacement which is along the axial axis of a mount and identified by the letter V in FIG. 2. Lateral mode shake mans side to side movement or displacement that is transverse of the longitudinal axis of the vehicle and is perpendicular to the fore and aft mode shake and identified by the letter L in FIG. 2. Lateral shake stiffness is the displacement of a mount in the lateral mode shake direction divided by unit load. Vertical mode shake stiffness is the displacement of a mount in the vertical mode shake direction divided by unit load. Fore and aft shake stiffness is the displacement of a mount in the fore and aft mode shake direction divided by unit load. The desired lateral mode, fore and aft mode and vertical mode load versus displacement relationship for a vehicle is shown in FIG. 1.

Figure 3:
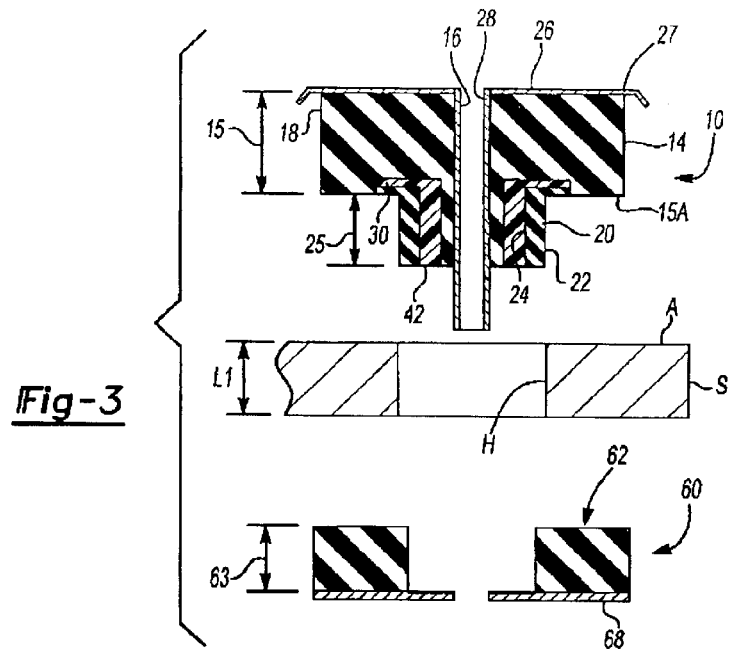
FIG. 3 is a vertical sectional exploded view of the isolation mount according to the invention.
Figure 4:
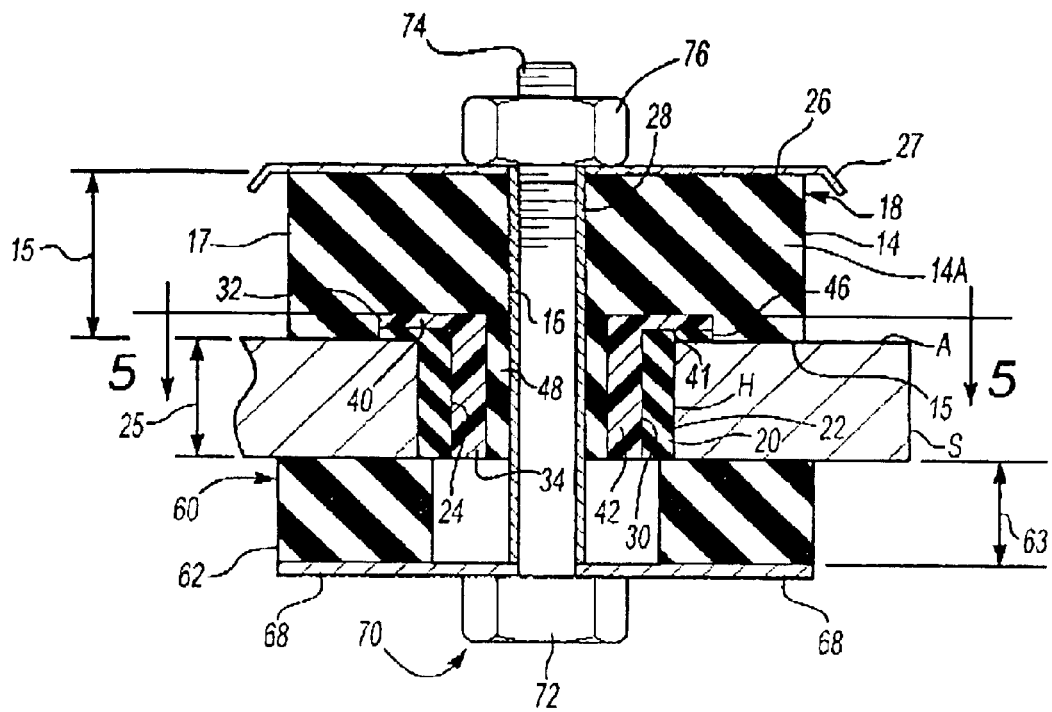
FIG. 4 is a vertical sectional view of the assembled isolation mount.

An isolation mount according to the present invention is designated by the numeral 100 as shown in FIGS. 2–4. The mount 100 includes an elastomeric upper mount 10, an elastomeric lower mount 60 and a threaded fastener member 70.

Figure 5:
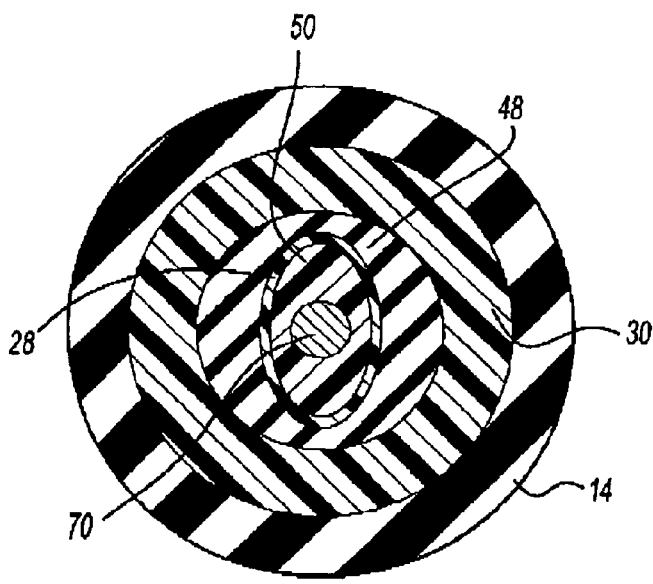
FIG. 5 is a top sectional view along 5—5 in FIG. 4.

The upper mount 10 has a thimble member 26 with a flange portion 27 and an axially extending tubular portion 28. The mount 10 has a foamed elastomeric annular portion 14 which preferably has a top portion 14A with an inner diameter 16 and an outer diameter 18. The top portion 14A has an axial length 15. Alternatively, the outer peripheral surface of the annular portion 14 may take any shape that can be used in the application, such as square, rectangular, polygonal, conical, triangular, elliptical or truncated conical or any other suitable shape. The annular portion 14 has an axially extending portion 20 which is a close blat sliding fit into the hole H in the subframe S. The axially extending portion 20 has an inner diameter 24 and an outer diameter 22 smaller than the outer diameter 18 of the top portion 14A. The axially extending portion 20 has an axial length 25 that extends the axial length L1 of the hole H in the subframe S. The bottom 15A of the annular portion 14 is placed adjacent the one side A of the subframe S. The axially extending tubular portion 28 is preferably elliptical in shape. Alternatively, the portion 28 may be round, parabolic with rounded ends or any other shape suitable for practicing the invention. As illustrated in FIG. 5, if the tubular portion 28 is elliptical in shape, the space between the tubular portion 28 and a threaded fastener 70 can optionally be provided with an elastomeric material 50.

An insert 30 is disposed in the annular portion 14 and in the axially extending portion 20. The inset 30 has an outer diameter 32 and an inner peripheral shape 34. The peripheral shape 34 is preferably, elliptical with a major diameter and a minor diameter which is similar to the shape of the annular axially extending layer 48.

The insert 30 has an annular flange portion 40 and an axially extending tube portion 42. Alternatively, the peripheral shape 34 may be parabolic with rounded ends or any other suitable shape that could be used in practicing the invention. The outer diameter 32 of the insert is larger than the outer diameter 22 of the axially extending portion 20. The tube portion 42 also has an axially extending length 45 which is normally the same as the length L of the hole H in the subframe S for a purpose to be discussed later on. The thickness of the tube portion 42 may vary radially. The thickness is greatest adjacent to the axis of the minor diameter which corresponds to the direction of the lateral mode L and thinnest near the axis of the major diameter which corresponds to the fore and aft mode F. The insert 30 is disposed in the upper mount 12 such that it extends along the free end of the tube portion 42 but the flange portion 40 is disposed in the annular portion 14. Thus there is a radial elastomeric layer portion 46 between the bottom surface 15A of the annular portion 14 and the bottom 41 of the flanged portion 40. Additionally, an annular axially extending elastomeric layer 48 is disposed against the elliptical inner peripheral shape 34 of the insert 30 and the tubular portion 28 of the thimble 26. The annular layer 48 has an elliptical shape.

If a stiffer response is required in the lateral L direction, a greater compressive force is imposed on the layer 48 by utilizing a thicker tubular member 28 having a larger outer periphery used in order to provide an additional compressive force on the elastomer. As a result, the elastomeric response rate becomes stiffer. If the tubular member 28 is reduced in thickness, or has a smaller outer peripheral surface area, the compressive force on the elastomeric layer 48 is reduced and the response rate of the elastomer becomes softer.

The elliptical shape of the layer 48 in the lateral displacement mode L provides an increased amount of volume of elastomer than a prior art round shaped layer, to absorb radial forces in the lateral mode direction L. This has two effects: 1) the large volume of elastomer provides the design engineer with another variable with which to tune the response of the mount to lateral displacement L to improve vehicle ride and handling characteristics: and 2) the larger volume of elastomer to absorb the lateral displacement forces to reduce stress in the elastomer. Thus, the elastomer has more area to absorb the force generated by the lateral displacement and as a result, the elastomer is exposed to a narrower range of material stress variations. Those skilled in the art will recognize that alternatively, the shape of the annular axially extending layer 48 and the tubular portion 28 of the thimble member and the peripheral shape 34 may be substantially parabolic in cross sectional area with rounded ends near the fore and aft, F, displacement mode or oblong in cross section or oval in cross sectional shape or any other non-circular shape suitable for practicing the invention.

The surface area of the tubular portion 28, in the lateral direction L, is preferably twice the surface area of the tubular portion 28 in the force and aft direction F. Alternatively, the ratio of surface area in the lateral direction L to surface area in the fore and aft direction F ranges from 1.05 to 4.0. The response of the mount to lateral forces is greater than the response to fore and aft forces, which is greater than the response to vertical forces. The vertical response ratio is lower or softer than the lateral or force and aft response rates.

The elastomeric lower mount 60 includes a lower annular portion 62. The annular portion 62 has an inner diameter 66 and an outer diameter of 64. A flat flanged annular member 68 is adjacent to the lower radial surface 65 of the lower annular portion 62. The inner diameter 66 is slightly greater than the outer diameter 22 of the axially extending portion 20. The lower mount has an axial length 63. The length 63 and the length 15 may be equal to each other. Optionally, the ratio of length 63 divided by length 15 may be greater than 1.0 or less than 1.0 depending on the vertical response rate desired.

A threaded fastener 70 is inserted into the inner diameter 66 of the lower mount 60, through the inner diameter 16 of the tubular portion 28 and a hole (not shown) in the body B. The head 72 of the threaded fastener 70 is adjacent to the flat flanged member 68 and the threaded portion 74 extends axially past the flanged portion 27 of the thimble 26. A threaded nut 76 engages the threaded portion 74 and the upper mount 10 and the lower mount 60 are clamped together to place a compressive axial load on the mounts 10, 60, respectively.

The upper isolator mount 10 and the lower isolator mount 60 are made of foamed elastomeric materials. Preferably, the members 14, 62, respectively, are made of a foamed microcellular polyurethane material (MCU) which can be compression molded, cast or injection molded or processed by m ans well known in the prior art. Altematively, other foamed elastomers such as foamed fluorocarbon, foamed highly saturated nitrile, methyl acrylate acid polymer foam, silicone foam, EPDM foam, Neoprene® foam or the like and thermoplastic elastomers may be used in practicing the invention. Neoprene® is a registered trademark of DuPont.

Foamed microcellular polyurethane is a polymer product obtained from the interaction of the di-isocyanate glycol and a blowing agent. The glycol is usually a polyol which can be of either the polyester or polyether type. Both types generally have hydroxyl groups that are free to react with the di-isocyanate. The polyesters are low molecular weight macroglycols. The isocyanate reacts with water to produce carbon dioxide gas for foaming. Foam density is determined by the quantity of water present in the formulation and is characterized by the weight of the polyurethane material divided by the overall volume of the part. Once intimately mixed, the ingredients are discharged from a mixer and deposited into a mold where the complex chemical reactions take place to form the microcellular polyurethane.

The chemical reactions are primarily exo-thermic which converts the liquid into a foam. This technology is known in the prior art. See *Rubber Technology, Third Edition*, edited by Maurice Morton-Van Norstand Reinhold, ISBN0-442-2642204, pages 555–560, which is incorporated by reference herein. The damping characteristics of a microcellular polyurethane foam are adjusted by the amount of gases trapped in the body of the polyurethane. Thus, the stiffness, and the vibration characteristics of the microcellular polyurethane can be adjusted by varying MCU density to meet specific application requirements. Microcellular polyurethane foam density varies from 0.3 to 0.8 grams per cubic centimeter. Preferably, the range of density is 0.4 to 0.6 grams per cubic centimeter. The typical characteristics of MCU elastomers as compared to solid rubber are primarily influenced by the microcellular structure of the material and not by the chemical backbone or primary polymeric material. Due to the microcellular nature of the MCU material, polyurethane cells will collapse on top of each other under compressing load. This in turn will provide for a higher vertical stiffness and hence permits tuning of the ride characteristics in the vertical mode direction.

The annular portion 14 preferably has a foam density which is greater than the density of the lower annular portion 62. Preferably, the portion 14 and portion 62 are made of MCU material and portion 14 has a density which is 0.05 grams per cubic centimeter greater than the density of portion 62. Alternatively, the foam density of portion 62 can be the same as or greater than portion 14.

While the invention has been described in connection with a preferred embodiment, it will be understood that it is not intended to limit the invention to that embodiment only. On the contrary, it is intended to cover all alternative modifications and equivalents that may be included within the spirit and scope of the invention as defined by the appended claims.

We claim:

1. An isolation mount and an automotive subframe assembly comprising:

an automotive subframe having a through hole; and an isolation mounting including an upper mount, a lower mount, and a fastener;

the upper mount including a thimble member and an elastomeric annular portion, the thimble member including an axially extending tubular portion, an axially extending portion extending from the elastomeric annular portion, said axially extending portion being received in the hole of the subframe, the axially extending tubular portion of the thimble member extending through the axially extending portion, an insert disposed in the elastomeric annular portion, the insert including an axially extending tube portion said axially extending portion and having a length that is approximately equal to a length of the hole in the subframe.

2. The isolation mount and automotive subframe assembly specified in claim 1 wherein the elastomeric annular portion of the upper mount is formed from foamed microcellular polyurethane.

3. The isolation mount and automotive subframe assembly specified in claim 1 wherein the tube portion of the insert is elliptical in cross-section and a diameter of the tube portion is greatest adjacent an axis of a minor diameter that corresponds to a lateral direction of the automotive subframe and is thinnest near an axis of a major diameter that corresponds to a fore and aft direction of the automotive subframe.

4. An isolation mount for an automotive subframe having a through hole, the isolation mount comprising:

an upper mount;

a lower mount; and a fastener; wherein the upper mount includes a thimble member and an elastomeric annular portion, the thimble member including an axially extending tubular portion, the annular portion including an axially extending portion that is received in the hole of the subframe, the axially extending tubular portion of the thimble member extending through the axially extending portion of the annular portion, an insert disposed In the annular portion, the insert including an axially extending tube portion radially inside said axially extending portion and having a length that is approximately equal to a length of the hole in the subframe.

* * * * *